Patented July 29, 1924.

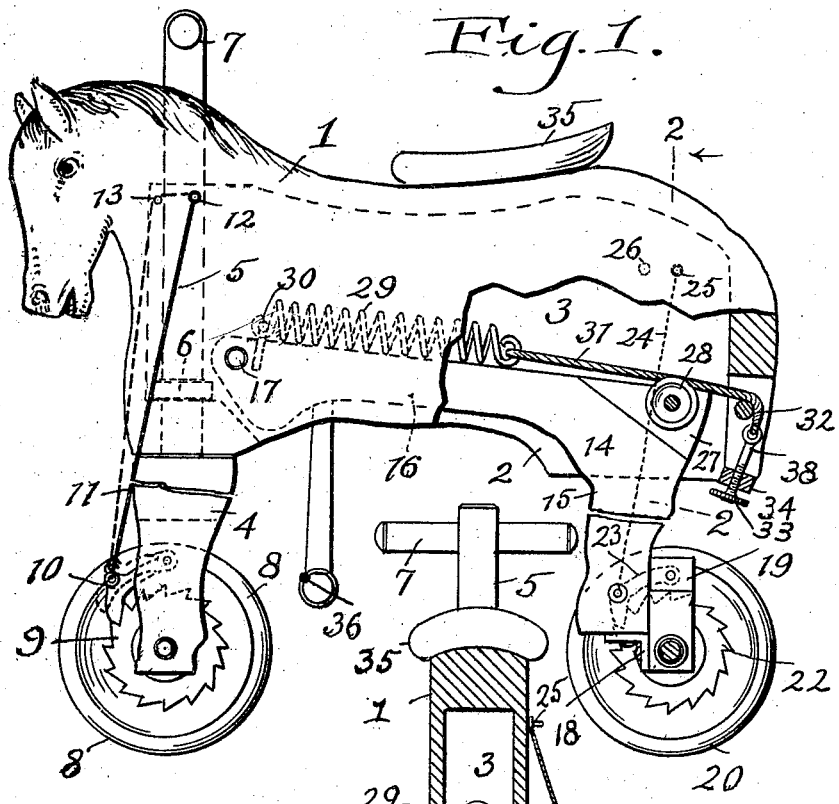

1,502,839

UNITED STATES PATENT OFFICE.

WILLIAM J. BARBER, OF EAST CLEVELAND, OHIO, ASSIGNOR TO THE E. & N. MANUFACTURING COMPANY, OF CLEVELAND, OHIO, A CORPORATION.

CHILD'S VEHICLE.

Application filed December 26, 1922. Serial No. 608,877.

*To all whom it may concern:*

Be it known that I, WILLIAM J. BARBER, a citizen of the United States, residing at East Cleveland, in the county of Cuyahoga and State of Ohio, have invented a certain new and useful Improvement in Children's Vehicles, of which the following is a full, clear, and exact description.

This invention relates to children's vehicles of the type in which the rocking movement of a spring counter-balanced seat carrying member is utilized to propel the vehicle.

The present invention contemplates providing a rocking body which has a seat thereon and a swiveled front supporting wheel, the body having in addition a rocking spring counterbalanced support on a rear supporting leg to which the rear wheels of the vehicle are attached, one or more of the supporting wheels being provided with means to prevent backward rotation whereby the rocking movement of the body serves to propel the vehicle in a forward direction.

An object of the invention is to provide a child's vehicle which is propelled by movements of a counterbalanced seat carrying member in which the moving parts are entirely housed within the body so that there are no exposed moving parts liable to snag the clothing or cause injury to the child using the vehicle.

A further object is to utilize the rocking movement of the body of the vehicle for propelling the vehicle through the front wheel.

A further object is to so arrange the rocking body with respect to the rear supporting leg that an effective leverage is provided for the counterbalance spring enabling the spring to return the rocking body to normal position upon a slight shifting of the weight of the rider.

A further object is to locate the seat at the rear of the pivot between the body and leg and to provide stirrups adjacent the pivot so that when the rider shifts a portion of his weight from the seat to the stirrup, the counterbalance spring returns the seat to raised position.

A further object is to provide a steering handle adjacent the seat and movable with the body so that rocking movement of the body does not interfere with the steering of the vehicle.

A further object is to provide means which will prevent rearward movement of the pivoted supporting leg during the operation of the device but which will not interfere with the turning movement of the vehicle.

Other objects will be apparent from the following description and accompanying drawings.

The following description and accompanying drawings set forth in detail certain means embodying my invention, the disclosed means, however, constituting but one of the various mechanical forms in which the principle of the invention may be employed.

Reference should be had to the accompanying drawings forming a part of this specification in which Fig. 1 is a side elevation of the vehicle with a part broken away to show the spring counterbalance mechanism; Fig. 2 is a vertical section on line 2—2 of Fig. 1 showing the rear wheels in rear elevation.

Referring to the accompanying drawings, the vehicle body 1 is preferably in the form of the body of a horse or other animal and is formed with spaced sides 2 forming between them a cavity 3 extending from the front to the rear of the body and open at the bottom of the body. The front leg 4 is rigidly attached to an upright post 5 which extends through the body 1 and is rotatably mounted therein. The post 5 has a collar 6 thereon within the cavity 3 of the body which engages the body at the bottom of the recess and cooperates with the leg 4 to prevent longitudinal movement of the post 5 in the body. The post 5 is provided at its upper end with a handle 7 by means of which the post can be turned to steer the vehicle. The leg 4 carries at its lower end a supporting wheel 8 which has fixed thereto a ratchet wheel 9 engaged by a pawl 10 carried by the leg 4. A cord 11 is attached to the outer end of the pawl 10 and to the body 1 at the point 12. The body 1 is provided with a peg 13 along side the point of attachment 12 of the cord 11 to the body. By lifting the cord 11 and hanging it over the peg 13, as shown in dotted lines in Fig. 1, the pawl 10 can be held out of engagement with the ratchet 9. The rear leg 14 has a vertical portion 15 adjacent the rear end of the body which extends upwardly into the cavity 3 of the body and a forwardly extending substantially horizontal portion 16 within the body which is connected to the front portion of the body adjacent the steering post 5 by means of a horizontal pivot 17. Rigidly attached to the lower end of the vertical portion 15 of the leg by means of a bracket 18 is a transversely extending axle 19 in the ends of which are journaled the rear supporting wheels 20 and 21 of the vehicle. The rear wheel 21 is free to turn in either direction but the rear wheel 20 is prevented from rotating in a backward direction by means of a ratchet wheel 22 fixed to the wheel 20 and a pawl 23 pivoted to the axle 19 which engages the ratchet wheel 22. To enable the pawl 23 to be held in inoperative position when desired, a cord 24 is attached to the outer end of the pawl and is attached to the body 1 at 25. Adjacent the point of attachment 25 of the cord 24 is a peg 26. By lifting the cord and hanging it over the peg 26, the pawl 23 can be lifted out of engagement of the ratchet wheel 22 and held in inoperative position. A recess 27 is formed in the leg 14 at the rear end of the horizontal portion 16 thereof within which is journaled a sheave 28. A coil spring 29 within the hollow body 1 is attached at its forward end to a transverse pin 30 fixed to the body 1 and is connected at its rear end to a cable 31 which extends rearwardly over the sheave 28 and over a small roller 32 at the rear end of the body 1 and is connected to an adjusting screw 33 which is adjustable in a cross bar 34 at the bottom of the body 1. A seat 35 is provided upon the top of the body 1 and stirrups 36 are suspended from the forwardly extending portion 14 of the rear leg.

The rider sits upon the seat 35 with his feet upon the stirrups or foot rests 36 and alternately shifts a portion of his weight from the seat to the stirrups and from the stirrups to the seat to propel the vehicle. When the rider permits his weight to rest entirely upon the seat 35, the body 1 rocks about the pivot 17, forcing the rear end of the body downwardly in opposition to the spring 29 until the top portion of the cavity 3 of the body engages the leg 14. By reason of the fact that the pivot 17 is adjacent the forward end of the body 1, the supporting leg 14 has only a slight pivotal movement. The rocking movement of the body 1 as above described causes the front leg 4 and wheel 8 to move forwardly with respect to the pivot 17. After the body has rocked downwardly as far as permitted, the rider will transfer a portion of his weight to the stirrups 36 which will cause the body 1 to be rocked back to normal position by the spring 29. During the forward rocking movement of the leg 4 the pawl 10 and ratchet 9 permits the wheel 8 to rotate freely in a forward direction. When the body 1 is returned to normal position by the spring 29 the wheel 8 is locked against rearward rotation by the pawl 10 and the rear wheels of the vehicle will be pulled forward. Thus the rider by shifting his weight from the seat to the stirrups and vice versa, can readily propel the vehicle in a forward direction. By reason of the fact that the steering post 5 is mounted in the body 1 and movable with the seat, the rider has no difficulty in steering the vehicle as it is propelled forwardly. It is desirable to provide means for preventing backward movement of the rear wheels of the vehicle, otherwise there would be some lost motion due to the pivotal movement of the supporting leg 14. It is essential, however, that the means for preventing backward rotation of the rear wheels shall not interfere with the turning movements of the vehicle. For this reason only one of the rear wheels is provided with a pawl and ratchet for preventing backward rotation, while the other rear wheel is left free to turn in either direction. The one pawl and ratchet in connection with the rear wheel 20 will prevent the rear axle from being pushed backwardly by the pivotal movement of the leg 14 during the operation of the vehicle while the freely turning wheel 21 permits the axle to swing freely in either direction during the turning movement of the vehicle.

It may sometimes be desired to use the device as a rocking horse without propelling it or it may be desired that the vehicle be free to move either backwardly or forwardly; means have therefore been provided for releasing the pawls from the ratchet wheels and retain them in inoperative position. When the cords 11 and 24 are hooked over the pegs 13 and 26, the wheels are free to rotate in either direction and the rider can propel the vehicle with his feet from the floor or rock the body without propelling the vehicle.

Having described my invention, I claim:

1. In a child's vehicle, a body having a supporting wheel mounted thereon adjacent its forward end, a rear support for said body comprising a rear axle with wheels thereon and a rigid leg connected at its rear end to said axle and at its forward end to said body adjacent the forward end thereof by means of a horizontal pivot, said body having a seat portion at the rear of said pivot, a spring coacting with said body and leg for normally holding the seat portion of the body in elevated position and means for preventing backward rotation of the forward supporting wheel.

2. In a child's vehicle, a body, a forward supporting wheel swiveled to the body, a steering handle connected to said wheel, a rear support for said body comprising a rear axle with wheels thereon and a rigid leg connected at its rear end to said axle and at its front end to the body toward the forward end thereof by a horizontal pivot, said body having a seat portion at the rear of said pivot, a spring connected to the rear end portion of said body and to said leg for normally holding the seat portion of the body in elevated position, and means for preventing backward rotation of the forward supporting wheel.

3. In a child's vehicle, a hollow body having a wheel supported front leg, a rear leg having an upright portion at its rear end upon which are mounted the rear wheels of the vehicle, said leg having a portion within the hollow body extending forwardly and connected by a horizontal pivot to the body adjacent its forward end, a spring carried by said rear leg, a cable connected at one end to said spring and at its other end to the rear end of said body, and a sheave mounted on the rear leg, said cable running over said sheave.

4. A child's vehicle, comprising a body to which is connected a rigid front supporting leg, a rear leg pivoted to the body adjacent the front leg thereof, and means for yieldingly supporting the rear end of said body upon said pivoted leg.

5. A child's vehicle, comprising a body having a front wheel swiveled thereto and provided with a steering handle, a rigid leg pivoted adjacent the forward end of the body and having supporting wheels mounted upon its rear end, and a tension spring connected with the rear end of said body and to the leg adjacent the pivot for normally holding the rear end of said body in elevated position.

6. A child's vehicle, comprising a body, a post swiveled in the forward end of the body, a wheel at the lower end of said post, a handle at the upper end of said post, a rear supporting leg connected to the body by a horizontal pivot adjacent said post, an axle with wheels thereon mounted on the rear end of said leg, said body having a seat portion at the rear of said pivot, a tension spring connected with the rear end of said body and to the leg adjacent the pivot to normally hold the seat portion of the body in elevated position, and means for preventing backward rotation of the forward wheel.

7. In a child's vehicle, a rear supporting structure comprising rear wheels and an angular leg having an upright rear portion and a portion extending forwardly from the upper end of the upright portion, a body connected adjacent its forward end by a horizontal pivot to the forward end of the forwardly extending portion of the leg, said body having mounted thereon a front supporting wheel and having a seat portion at the rear of the pivot, a spring interposed between the body and leg and means for preventing backward rotation of the front supporting wheel.

8. A child's vehicle, comprising a body, a front wheel swiveled to the body, a rear supporting leg which is connected by a horizontal pivot to the forward portion of the body, and has at its rear end an axle with independently rotatable wheels thereon, a spring interposed between said leg and the rear portion of said body, and means for preventing backward rotation of the front supporting wheel and one of the rear wheels, the other of the rear wheels being freely rotatable in either direction.

9. In a child's vehicle, a body member carrying a wheeled support at its forward end, a leg member having independently rotatable wheels at its rear end and connected at its forward end by a horizontal pivot to the body member toward the front thereof, said body member having a seat portion at the rear of the pivot, means for preventing backward rotation of a front and rear wheel, a spring interposed between said members, and stirrups suspended from one of said members adjacent the pivot.

10. In a child's vehicle, a hollow body, an upright post rotatably mounted in the forward portion of the body, a wheel mounted upon the lower end of said post, a steering handle at the upper end of said post, a supporting leg having a rear substantially vertical portion carrying an axle with wheels thereon at its lower end and a substantially horizontal portion within the lower portion of said body extending forwardly and connected by a horizontal pivot to the body, and a seat on the body at the rear of said pivot, a spring interposed between the rear end of the body and the leg.

11. A child's vehicle, comprising a pair of pivotally connected members, a front supporting wheel on one of said members mounted to swing laterally, a steering member connected to said wheel, means for preventing backward rotation of said wheel, a pair of supporting wheels mounted on the other of said members, one of said pair of wheels being free to turn in either direction, means for preventing backward rotation of the other of said wheels, and a spring interposed between said members.

12. In a child's vehicle, a pair of pivotally connected members, one of said members having a seat thereon at the rear of the pivot, a swiveled front wheel carried by the seat carrying member, a steering handle connected to said front wheel, means for preventing backward rotation of said wheel, a spring interposed between the rear portion of the seat carrying member and the other member, a pair of rear supporting wheels mounted on said last mentioned member, one of said wheels being free to turn in either direction, and means for preventing backward rotation of the other of said wheels.

13. In a child's vehicle, a seat carrying member, a swiveled front supporting wheel and a pair of rear supporting wheels therefor, said front and rear wheels being mounted for movement toward and from each other and adapted to be spread apart under the weight of the rider, a spring for returning the wheels to normal position, means for preventing backward rotation of the front wheel and means for preventing backward rotation of one of the rear wheels, the other rear wheel being free to turn in either direction.

In testimony whereof, I hereunto affix my signature.

WILLIAM J. BARBER.